United States Patent
Corbett et al.

(10) Patent No.: US 7,322,737 B2
(45) Date of Patent: Jan. 29, 2008

(54) CONNECTOR MANAGEMENT STRUCTURE WITH CHANNEL

(75) Inventors: Timothy J Corbett, Corvallis, OR (US); Robert M. Schneider, Corvallis, OR (US); Mark R Thackray, Corvallis, OR (US); Glen A. Oross, Corvallis, OR (US); Peter On, Corvallis, OR (US); Francois Duval, Terrebonne (CA); Ivan Brousseau, Montreal (CA); Serge Dubeau, Laval (CA); Gad Shaanan, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 11/063,068

(22) Filed: Feb. 22, 2005

(65) Prior Publication Data

US 2006/0240704 A1   Oct. 26, 2006

(51) Int. Cl.
*G06F 1/16* (2006.01)
(52) U.S. Cl. .................. 362/683; 439/501; 439/131

(58) Field of Classification Search ............... 439/501, 439/131; 361/681–683
See application file for complete search history.

(56) References Cited

U.S. PATENT DOCUMENTS

| 4,866,215 | A | * | 9/1989 | Muller et al. ................. 174/50 |
| 5,093,729 | A |   | 3/1992 | Nodama et al. |
| 5,681,183 | A |   | 10/1997 | Dzmura |
| 5,689,574 | A | * | 11/1997 | Heirich et al. .............. 381/354 |
| 5,978,211 | A | * | 11/1999 | Hong .......................... 361/683 |
| 6,127,631 | A | * | 10/2000 | Green et al. .............. 174/72 A |
| 6,168,124 | B1 | * | 1/2001 | Matsuoka et al. ....... 248/176.1 |
| 6,307,737 | B1 |   | 10/2001 | Ogawa et al. |
| 6,392,873 | B1 |   | 5/2002 | Honda |
| 6,816,364 | B2 | * | 11/2004 | Helot et al. ................. 361/681 |
| 7,076,325 | B1 | * | 7/2006 | Rapaich et al. ............. 700/213 |
| 2005/0170687 | A1 | * | 8/2005 | Goh .......................... 439/501 |

* cited by examiner

Primary Examiner—Truc Nguyen

(57) ABSTRACT

A structure for permitting connectors to be passed through a support from back to front is herein disclosed. The structure includes a channel formed in the support from a rear surface to a front surface. A connector passed through the channel may be coupled to a terminal disposed on the front surface of the support.

7 Claims, 7 Drawing Sheets

CONNECTOR MANAGEMENT STRUCTURE WITH CHANNEL

TECHNICAL FIELD

The present invention relates to a structure for easing the connection of cables and connectors to a display.

BACKGROUND

Connecting items such as computers, video recorders, stereo systems, cameras, digital recorders, and the like to a display such as a computer monitor or television or the like is typically done at the rear of the display. As it is rare that the rear of a display is easily accessible, the rear being often against a wall or enclosed in a cabinet, it can be difficult to effect connections to the display. Accordingly, there is a need to facilitate the connection of stand alone devices to a display.

DETAILED DESCRIPTION

Figure 1:
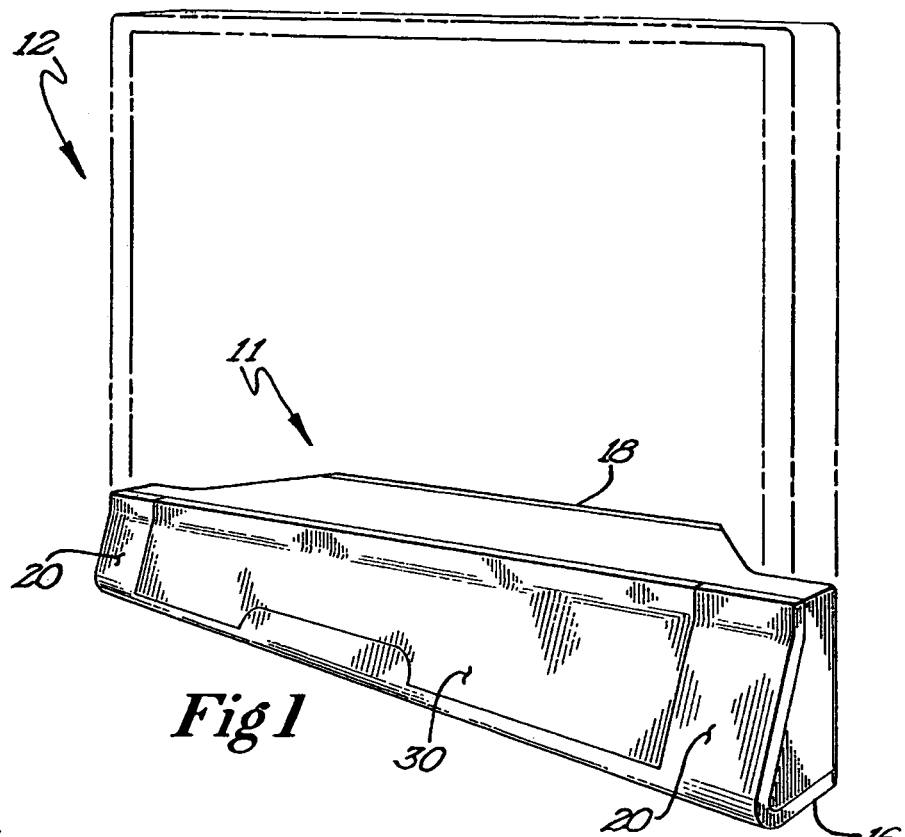
FIG. 1 is a perspective view of a display base according to one embodiment of the present invention.
Figure 2:
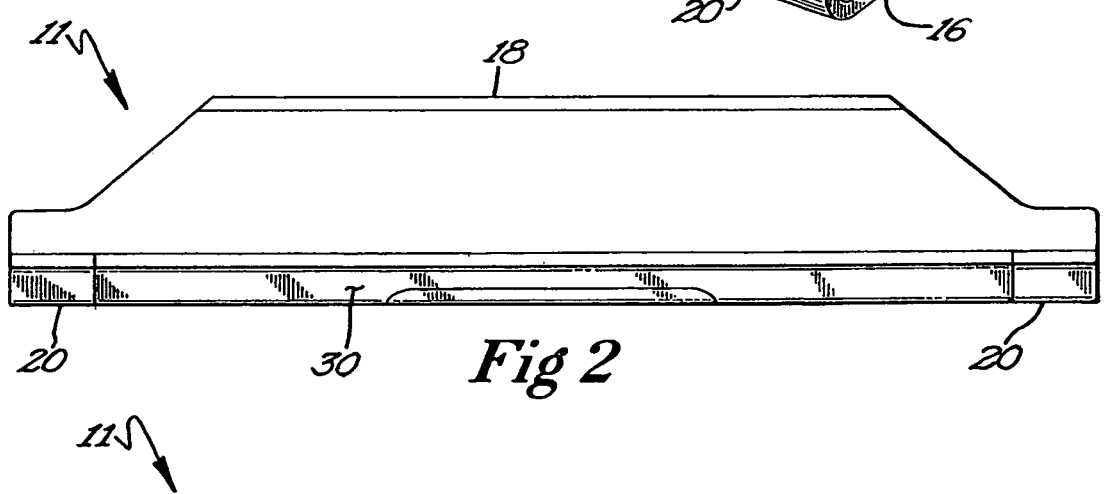
FIG. 2 is a top plan of the display base of FIG. 1.
Figure 3:
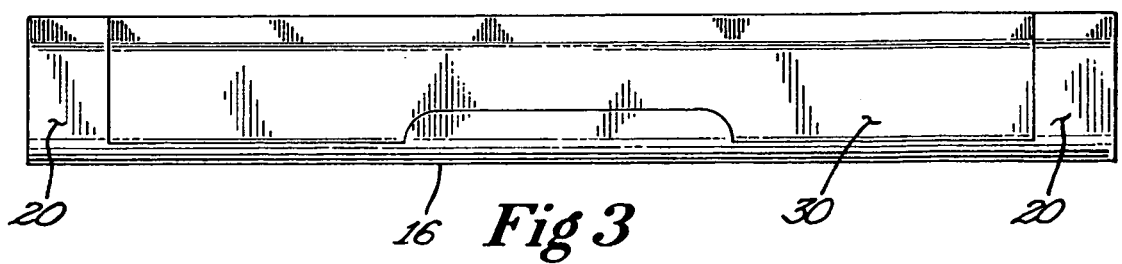
FIG. 3 is a front elevation view of the display base of FIG. 1.

In the following detailed description, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

In various embodiments, the present invention includes a channel that allows cables and connectors to be passed through a monitor or the base of a monitor and to thereafter allow the cables or connectors to be coupled to terminals that are located on a front side of the monitor or base.

Figure 4:
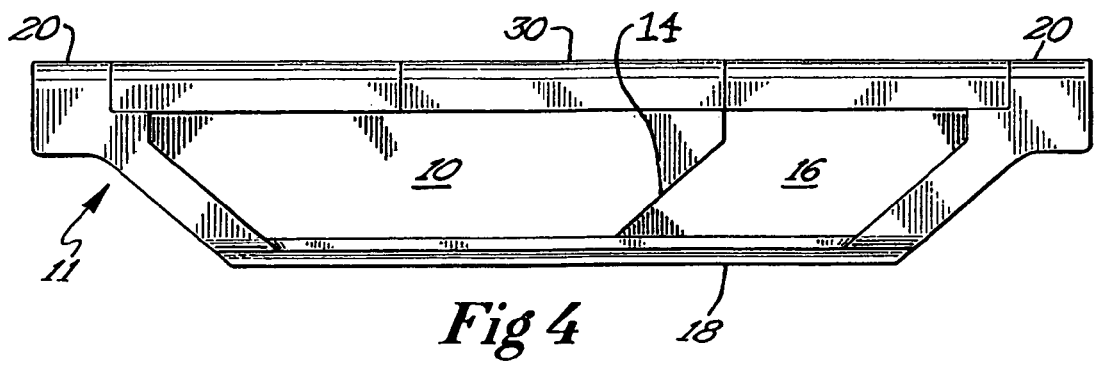
FIG. 4 is a bottom plan view of the display base of FIG. 1 that illustrates a channel formed in the bottom of the display base.
Figure 5:
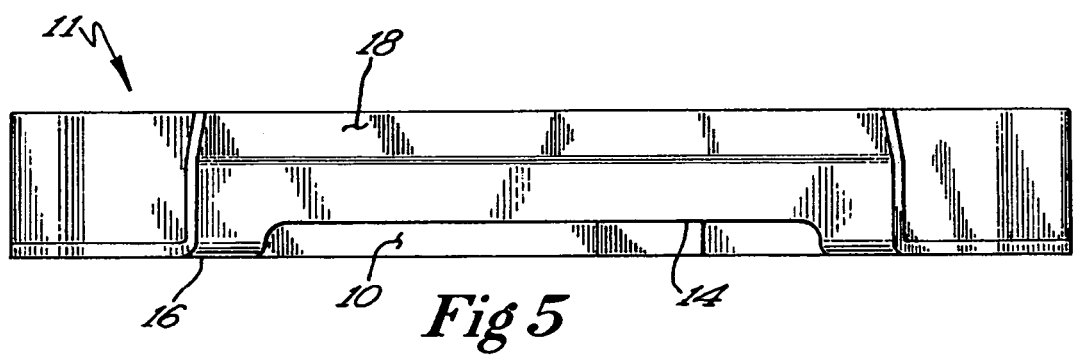
FIG. 5 is a rear elevation view of the display base of FIG. 1.
Figure 6:
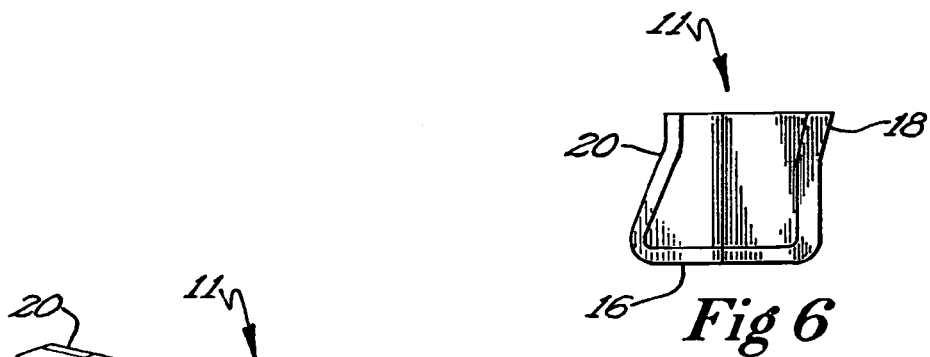
FIG. 6 is a side elevation view of the display base of FIG. 1, the right and left sides being mirror images of one another.
Figure 7:
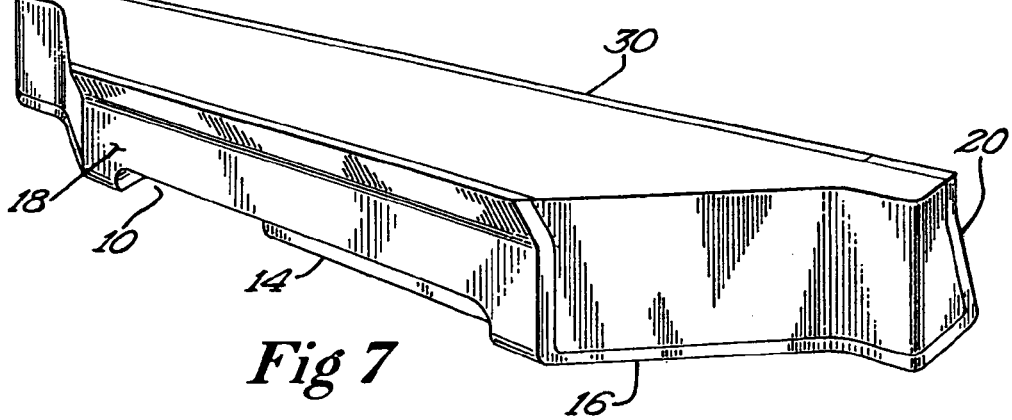
FIG. 7 is a rear perspective view of the display base of FIG. 1.
Figure 8A:
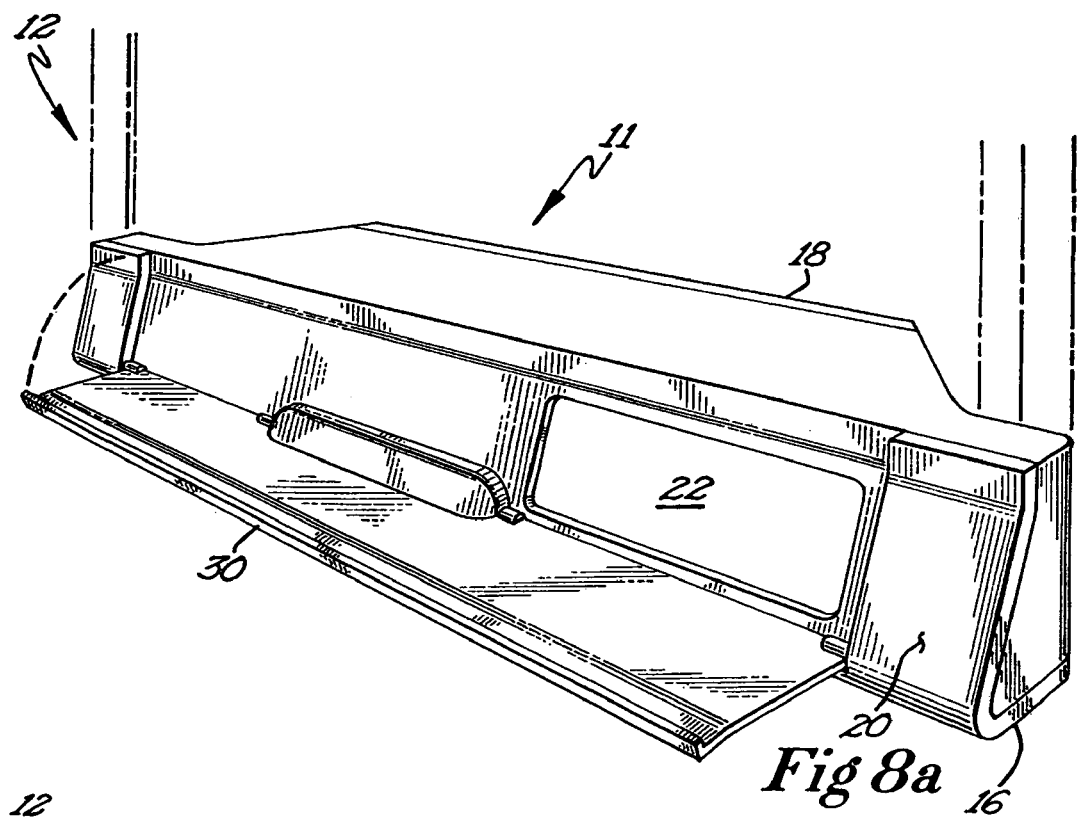
FIG. 8a is a perspective view of the display base of FIG. 1 in which a door panel of the display base is in an open position.
Figure 8B:
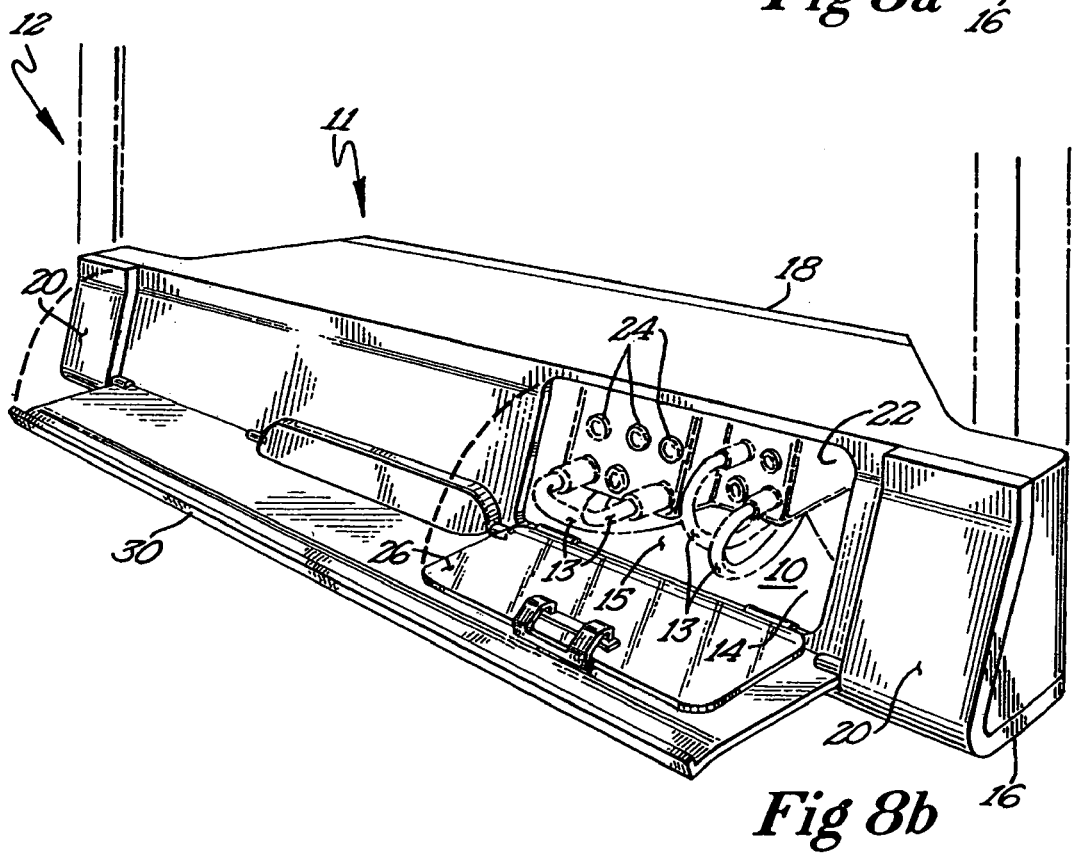
FIG. 8b is a perspective view of the display base of FIG. 8a in which a chamber and pass-through according to one embodiment of the invention may be seen.
Figure 9:
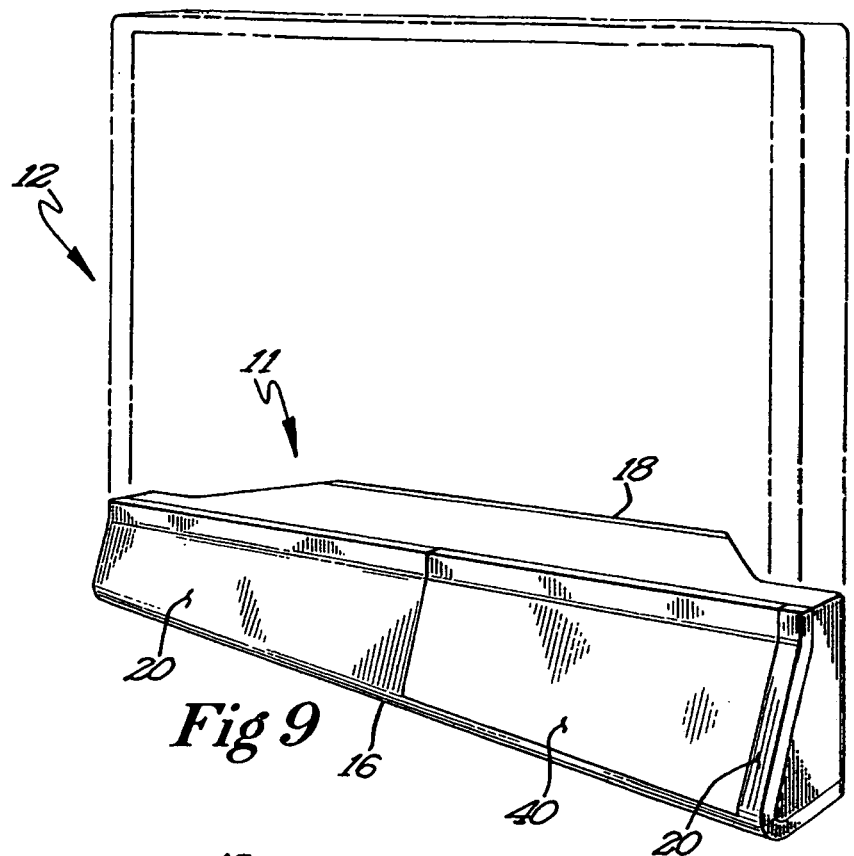
FIG. 9 is a perspective view of a display base according to another embodiment of the present invention.
Figure 10:
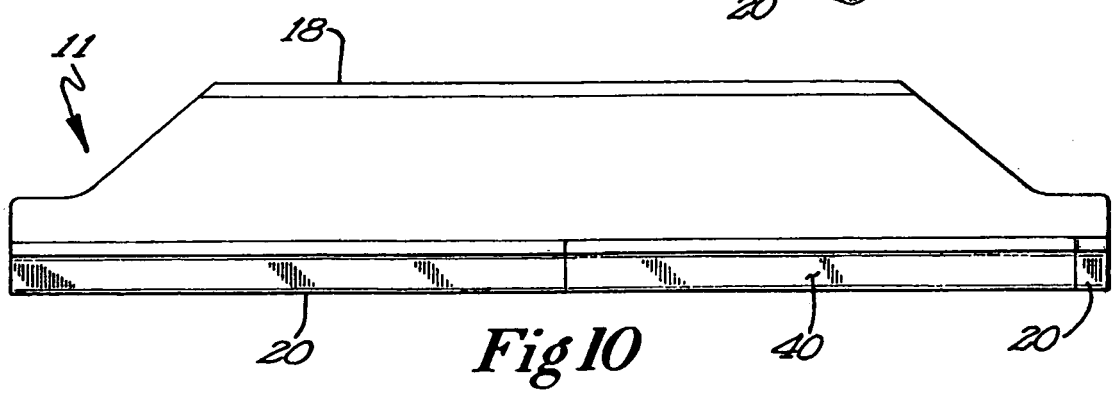
FIG. 10 is a top plan view of the display base of FIG. 9.
Figure 11:
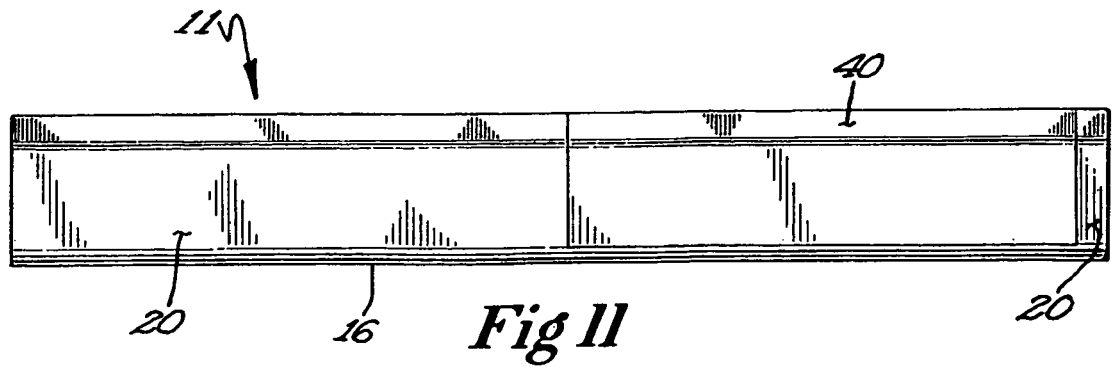
FIG. 11 is a front elevation view of the display base of FIG. 9.
Figure 12:
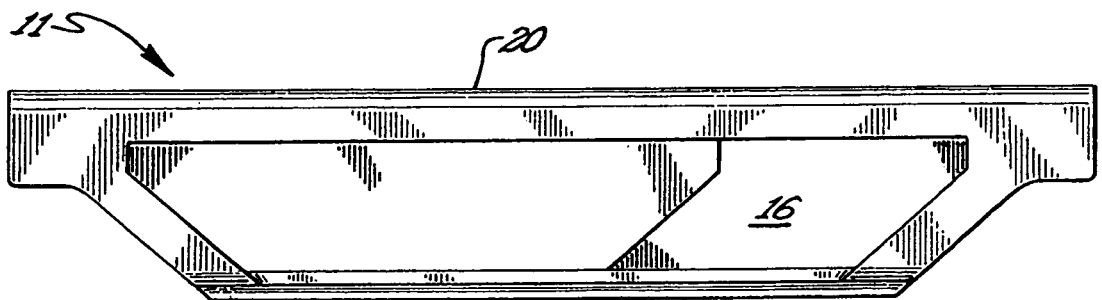
FIG. 12 is a bottom plan view of the display base of FIG. 9.
Figure 13:
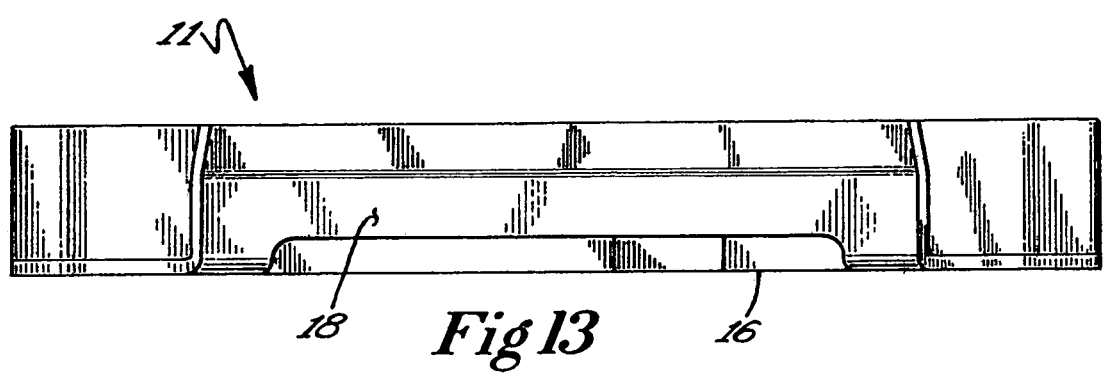
FIG. 13 is a rear elevation view of the display base of FIG. 9.
Figure 14:
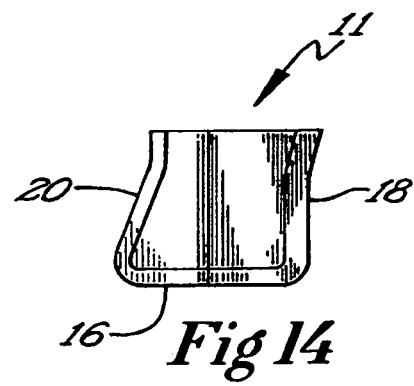
FIG. 14 is a side elevation view of the display base of FIG. 9, the right and left sides being mirror images of one another.
Figure 15:
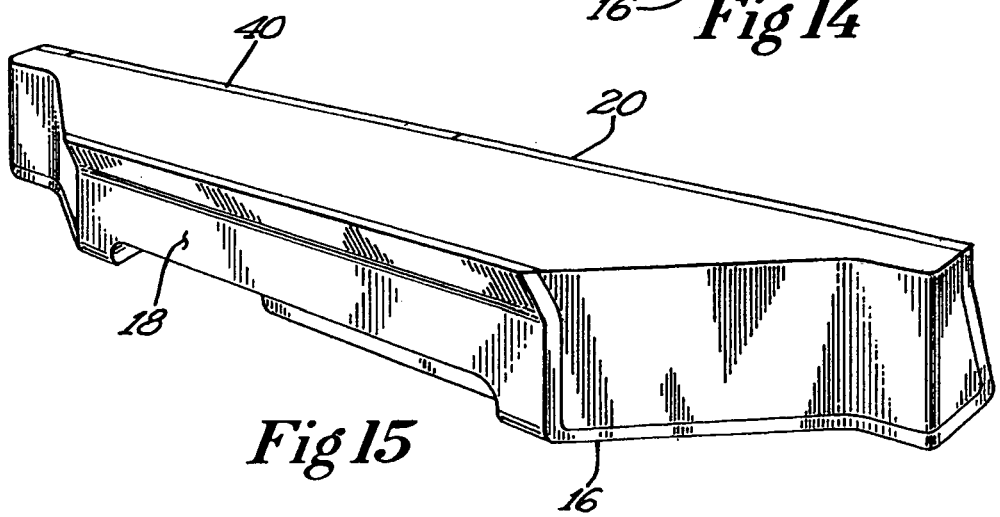
FIG. 15 is a rear perspective view of the display base of FIG. 9.
Figure 16:
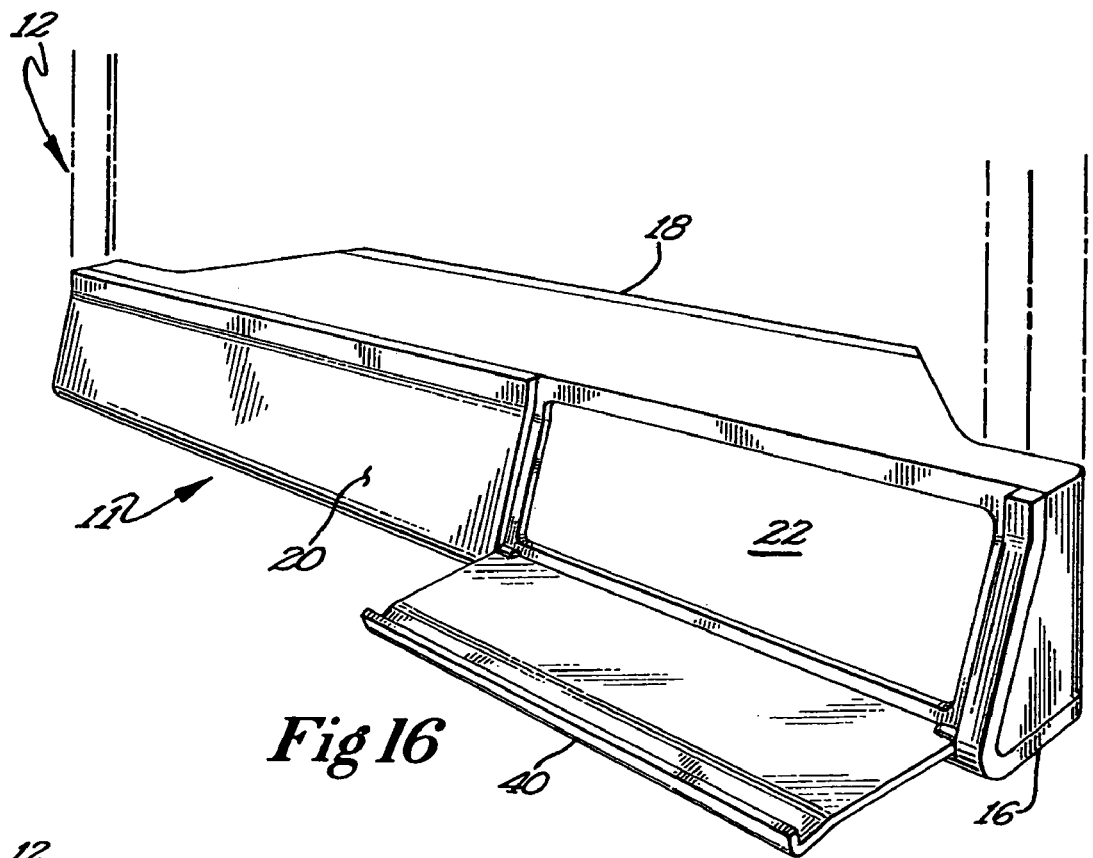
FIG. 16 is a perspective view of the display base of FIG. 9 in which a door panel of the display base is in an open position.

Referring first to FIGS. 1-8b and more specifically to FIGS. 4 and 8b, one embodiment of the present invention includes a pass-through 10 formed in a monitor 12. The pass through 10 may in one embodiment be an open sided channel 14 formed in the undersurface 16 of a monitor 12. The channel 14 extends from a rear side 18 of the monitor 12 to a front side 20 of the monitor 12 such that cables and connectors 13 may be passed therethrough. In one embodiment, the channel 14 is formed into a contiguous base 11 of a monitor 12. In other embodiments, the base 11 may be a structure or support that is separate and distinct from the monitor 12.

In one embodiment, the front opening 15 of the channel 14 is positioned to communicate with a connector chamber 22 that itself is formed into the front side 20 of the monitor. The chamber 22 is sized to provide a desired selection of connector terminals 24 and further has a volume specified to allow connectors 13 to be passed through the channel to be coupled to the terminals 24. Connector terminals 24 may include any of a number of audio, video, data, communications, networking, or other suitable or desired connections. In some embodiments, the terminals 24 may include universal serial bus (USB) ports for connecting various computing and memory devices; parallel or serial connections for connection to various computing or networking devices; coaxial connections for cable radio and television signals; and analog signal connectors for sensors and other analog inputs and the like. In one embodiment, the volume of the chamber 22 and the dimensions of the channel 14 are such that they will accommodate a one to one relationship between connectors 13 and terminals 24. In another embodiment, the chamber and channel 14 are sized such that fewer connectors 13 than terminals 24 are accommodated. In yet another embodiment, the channel 14 may be oversized with respect to the chamber 22 such that more connectors 13 may be accommodated than there are terminals 24. In this manner, multiple connectors 13 for multiple devices (not shown) may be accommodated in that a user may decouple a first connector 13 from a given terminal 24 and couple second connector 13 thereto, the second connector 13 having been already disposed within the pass-through 10, thereby allowing for rapid switching between the devices.

In the embodiment illustrated in FIG. 8b, the chamber 22 has an inner door or cover 26 associated therewith. In one embodiment, the door 26 is hinged to rotate between open and closed positions that permit access to and close the chamber 22, respectively. In another embodiment, the door 26 may slide laterally between open and closed positions. The door 26 may be opaque or transparent. In the embodiment illustrated in FIGS. 1-17, the door 26 is somewhat larger than the opening of chamber 22.

In some embodiments, such as that illustrated in FIGS. 1-8b, the base 11 is provided with an outer cover panel 30 that extends the entire width of the base 11 to provide a smooth facade on the front of the base 11. The panel 30 is hinged at its bottom edge 32 to rotate between a closed position, as shown in FIG. 1 and an open position, as shown in FIG. 8. The cover panel 30 hides chamber 22 and, if provided, inner door 26 from view when the outer cover panel 30 is in its closed position. Note that in some embodiments, the cover panel 30 may be hinged at its upper edge, may slide laterally, or may be hinged at its sides in such a manner as to permit access to the chamber 22 that is hidden behind the panel 30 when the panel 30 is in its closed position.

In another embodiment illustrated in FIGS. 9-17, the base 11 is provided with a cover panel 40 that covers only that area of the base 11 adjacent the chamber 22. In this embodiment, the chamber 22 is not typically provided with an inner door 26 such as that illustrated in FIG. 8, but one may be included, where appropriate. In some embodiments, the panel 40 has a shape that conforms to that of the remainder of the facade of the base 11.

Figure 17:
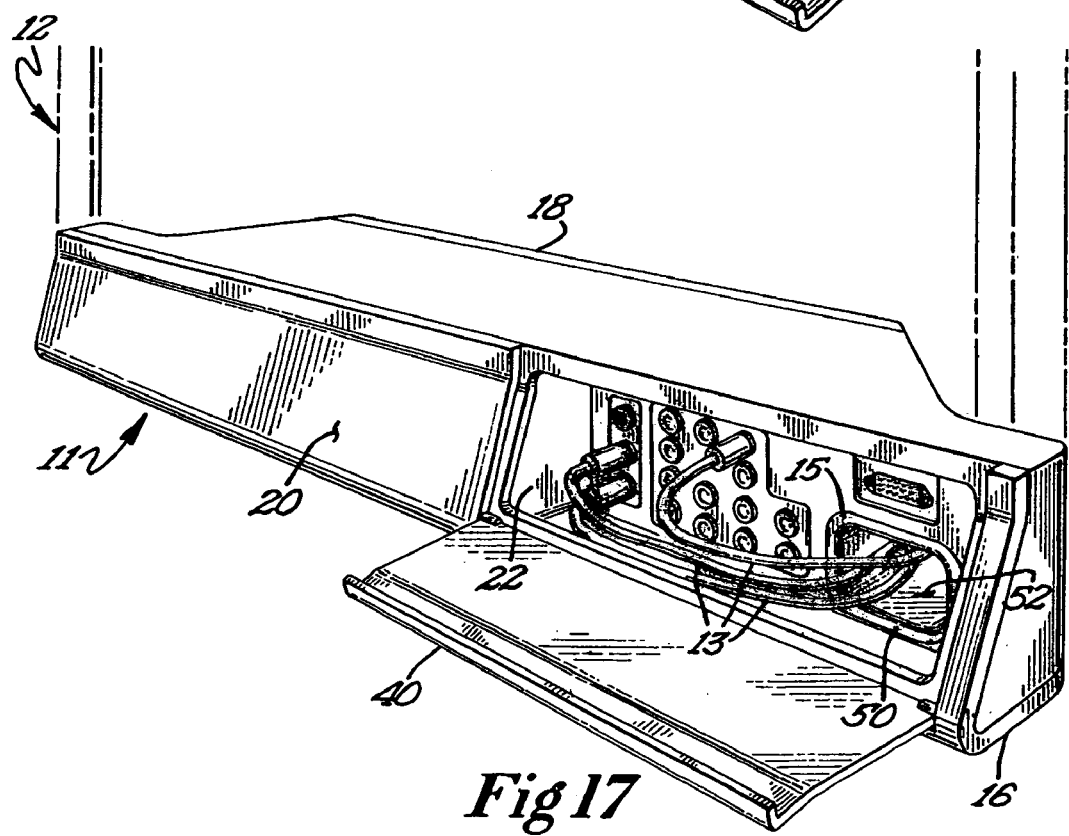
FIG. 17 is a perspective view of the display base of FIG. 16 in which a chamber and pass-through according to one embodiment of the invention may be seen; and, FIG. 18 is a perspective view of an embodiment of the display base that omits the chamber.

As seen in FIG. 17, the pass through 10 may be embodied as a passage or tunnel 50 formed entirely through the base 11. The passage 50 differs from the channel 14 in that the passage 50 includes a peripheral wall 52 that encloses the passage 50 across its entire length, from the rear side 18 of the base 11 to the front side 20 thereof.

Figure 18:
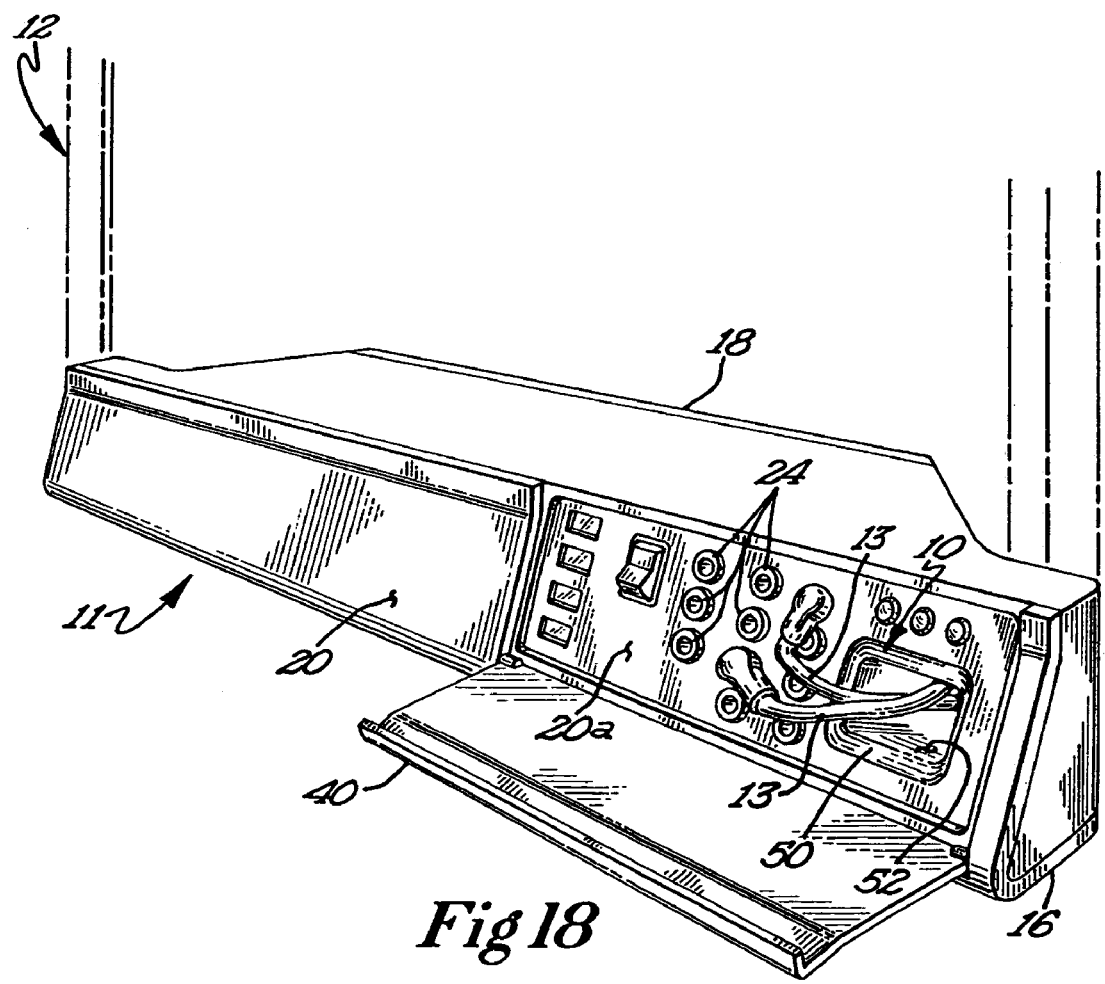

In another embodiment illustrated in FIG. 18, terminals 24 are located on a front surface 20 of the base 11 and are normally covered by a panel 30. A pass-through 10 that is one of a channel or passage formed through the base and extending from the rear surface 18 to the front surface 20 of the base permits a user to pass connectors 13 through the base 11. When the panel 30 is in its open position, the connectors 13 may be coupled to the terminals 24 on the front surface 20a of the base 11. Note that in this embodiment, there is no chamber as illustrated in FIGS. 1-17 and therefore, connections made between the connectors 13 and the terminals 24 are made where the panel 30 is in an open position.

In use, connectors 13 are passed through the channel 14 or passage 50 in the base 11 of the support or monitor such that the distal ends of the connectors 13 emerge at the front side 20 of base 11. Selected connectors 13 are then coupled to selected terminals 24.

CONCLUSION

Although specific embodiments have been illustrated and described herein, it is manifestly intended that this invention be limited only by the following claims and equivalents thereof.

What is claimed is:

1. A connector management structure for a display comprising:
   a channel formed in a base of the display;
   a chamber formed in a front surface of the base, the channel communicating with the chamber;
   at least one terminal disposed within the chamber of the base such that a connector passed through the channel may be connected to the at least one terminal within the chamber.

2. The connector management structure for a display of claim 1 wherein the channel extends from a rear surface of the base to a front surface thereof.

3. The connector management structure for a display of claim 1 wherein the channel is open at a bottom surface of the base.

4. The connector management structure for a display of claim 2 wherein the channel is enclosed from the rear surface of the base to the front surface of the base.

5. The connector management structure for a display of claim 1 further comprising a cover that is disposed over the chamber, the cover being constructed and arranged to move between an open position in which the chamber is accessible from the front side of the base and a closed position in which the chamber is inaccessible.

6. The connector management structure for a display of claim 5 wherein the cover moves between its open and its closed positions in a manner chosen from a group consisting of sliding and rotating.

7. The connector management structure for a display of claim 1 further comprising a plurality of terminals wherein the terminals are chosen from a group consisting of USB terminals, video terminals, audio terminals, networking terminals, analog signal terminals, coaxial terminals, parallel communications terminals, serial communications terminals, and terminals connected to wireless communications devices.

* * * * *